United States Patent
Even

(10) Patent No.: US 6,393,399 B1
(45) Date of Patent: May 21, 2002

(54) COMPOUND WORD RECOGNITION

(75) Inventor: Stijn Van Even, Jamaica Plain, MA (US)

(73) Assignee: ScanSoft, Inc., Peabody, MA (US)

( * ) Notice: Subject to any disclaimer, the term of this patent is extended or adjusted under 35 U.S.C. 154(b) by 0 days.

(21) Appl. No.: 09/163,422

(22) Filed: Sep. 30, 1998

(51) Int. Cl.[7] .............................................. G10L 15/18
(52) U.S. Cl. ...................................... 704/257; 704/235
(58) Field of Search ................................ 704/1, 9, 200, 704/231, 257, 255, 240, 243, 235, 236

(56) References Cited

U.S. PATENT DOCUMENTS

| | | | |
|---|---|---|---|
| 4,181,821 A | 1/1980 | Pirz et al. | |
| 4,227,176 A | 10/1980 | Moshier | |
| 4,481,593 A | 11/1984 | Bahler | |
| 4,489,435 A | 12/1984 | Moshier | |
| 4,783,803 A | 11/1988 | Baker et al. | |
| 4,805,218 A | 2/1989 | Bamberg et al. | |
| 4,805,219 A | 2/1989 | Baker et al. | |
| 4,829,576 A | 5/1989 | Porter | |
| 4,864,501 A * | 9/1989 | Kucera et al. | 704/8 |
| 5,027,406 A | 6/1991 | Roberts et al. | |
| 5,233,681 A | 8/1993 | Bahl et al. | |
| 5,267,345 A | 11/1993 | Brown et al. | |
| 5,369,577 A * | 11/1994 | Kadashevich et al. | 704/9 |
| 5,428,707 A | 6/1995 | Gould et al. | |
| 5,666,465 A * | 9/1997 | Ozawa | 704/222 |
| 5,754,972 A * | 5/1998 | Baker et al. | 704/200 |
| 5,765,132 A | 6/1998 | Roberts | |
| 5,797,122 A * | 8/1998 | Spies | 704/255 |
| 5,799,274 A * | 8/1998 | Kuroda | 704/239 |
| 5,893,133 A * | 4/1999 | Chen | 707/535 |
| 5,907,821 A * | 5/1999 | Kaji et al. | 704/4 |
| 5,946,648 A * | 8/1999 | Halstead, Jr. et al. | 704/9 |

FOREIGN PATENT DOCUMENTS

DE 195 10 083 9/1996 ............. G10L/5/06

OTHER PUBLICATIONS

Frisch et al.; "Spelling assistance for compound words"; IBM Journal of Research and Development; No. 32(2); pp. 195–200; Mar. 1998.

European Search Report (EP 99 30 7567); Apr. 12, 2000.

Bandara, Upali et al., "Handling German Compound Words in an Isolated–Word Speech Recognizer," 1991 IEEE Workshop on Speech Recognition, Harriman, NY (Dec. 15–18, 1991).

* cited by examiner

Primary Examiner—Richemond Dorvil
(74) Attorney, Agent, or Firm—Fish & Richardson P.C.

(57) ABSTRACT

Recognition of a text string is improved by analyzing the text string with respect to information about expected patterns of the parts of speech of words in the text string and by modifying the text string based on the analysis. Analyzing may include comparing the combinations of parts of speech to parts of speech associated with the words in the text string and, if at least one of the combinations of parts of speech matches parts of speech associated with the words, indicating that a compound word should be formed from the words associated with the matched parts of speech.

24 Claims, 12 Drawing Sheets

COMPOUND WORD RECOGNITION

TECHNICAL FIELD

The invention relates to computer-implemented speech recognition.

BACKGROUND

A typical speech recognition system includes a recognizer and a stored vocabulary of words which the recognizer is capable of recognizing. The recognizer receives information about utterances by a speaker and delivers a corresponding recognized word or string of recognized words drawn from the vocabulary. The stored vocabulary often includes additional information for each of the vocabulary words, such as the word's part of speech (e.g., noun, verb, adverb).

In German, consecutive words in a sentence are frequently concatenated to form compound words. For example, referring to FIG. 1a, in the string of spoken words "er hört daB der President Wahl Kampf Geschichten geschrieben hat" 8 (which, translated into English, is "he hears that the president has written election campaign stories"), the words "Wahl," "Kampf," and "Geschichten" would be combined to form the compound word "Wahlkampfgeschicten."

Some German speech recognition systems place frequently used compound words in the stored vocabulary to enable them to recognize those words using standard recognition techniques. Other German speech recognition systems are trained with text containing compound words. During training, such systems identify compounds words in the text and also identify the constituent words which make up the compound words. During recognition of German speech, such systems form compound words by concatenating words which were previously identified as making up compound words in the training text.

SUMMARY

In one aspect, a computer is used to improve recognition of a text string including words in a language (e.g., German) having associated parts of speech. The text string is analyzed with respect to information about expected patterns of the parts of speech in the language and modified based on the analysis. The information may include rules descriptive of combinations of parts of speech in the language corresponding to compound words in the language. The combinations of parts of speech may be sequences of parts of speech.

Analyzing may include comparing the combinations of parts of speech to parts of speech associated with the words in the text string and indicating that a compound word should be formed from the words associated with the matched parts of speech if at least one of the combinations of parts of speech matches parts of speech associated with the words. Modifying the text string may include forming a compound word from words in the text string. The compound word may be added to a vocabulary.

Modifying the text string may include replacing words in the text string with the compound word. The modified text string may be added to a list of candidate text strings. The text string may be analyzed with respect to rules descriptive of other, unpreferred combinations of parts of speech in the language corresponding to combinations of words which do not typically form compound words in the language and it may be indicated that a compound word should not be formed from the words associated with the matched parts of speech if at least one of the unpreferred combinations of parts of speech matches parts of speech associated with the words. The unpreferred combinations of parts of speech may correspond to combinations of groups (e.g., pairs) of parts of speech, with the groups corresponding to phrases.

The compound word may be added to a compound word cache. Adding the compound word may include increasing the frequency count of the compound word in the compound word cache. The compound word also may be added to a vocabulary.

The text string may be analyzed with respect to agreement rules descriptive of patterns of agreement of case, number, and gender of words corresponding to combinations of words which do not typically form compound words in the language, and it may be indicated that a compound word should not be formed from the matching words if at least one of the agreement rules matches words in the text string.

The agreement rules may include a rule indicating that if a noun in a subordinate clause matches the case, number, and gender of a preceding determiner, a compound word should not be formed from the noun and subsequent words in the subordinate clause. The agreement rules may include a rule indicating that if a noun in a non-subordinate clause matches the case, number, and gender of a preceding determiner, a compound word should not be formed from words in the noun phrase containing the noun and words subsequent to the noun phrase.

The compound word may be identified as an incorrect compound word, and the compound word may be added to a compound word error cache. Adding the compound word to the compound word error cache may include increasing a frequency of the compound word in the compound word error cache. If the compound word has been identified as an incorrect compound word, it may be indicated that the compound word should not be formed from the words associated with the matched parts of speech. The compound word may be identified as an incorrect compound word in response to action of a user by adding the compound word to a compound word error cache. It may be indicated that the compound word should not be formed from the words associated with the matched parts of speech if the compound word has been identified as an incorrect compound word more frequently than the compound word has not been identified to be an incorrect compound word.

Among the advantages of the invention are one or more of the following.

Use of language-specific compounding rules to recognize compound words allows recognition of compound words which are not in the stored vocabulary. A speech recognition system that is capable of recognizing compound words may, therefore, use a stored vocabulary which contains only ordinary (non-compound) words, or which contains only a small number of frequently-used compound words. Reducing the number of compound words that are stored in the stored vocabulary reduces the amount of time and effort needed to generate the vocabulary and reduces the total size of the vocabulary. The ability to recognize compound words not stored in the vocabulary also potentially increases the total number of recognizable compound words. Reduction in vocabulary size may also result in increased recognition speed. Furthermore, the space that is saved may be used for other purposes, such as storing domain-specific vocabularies.

Use of compounding rules to recognize compound words also facilitates modification of the speech recognition system's compound word recognition capabilities. The set of compound words recognized by the speech recognition system may be changed by adding, deleting, or modifying the compounding rules, rather than by modifying the stored vocabulary. This feature also facilitates addition of compound word recognition capabilities to existing speech recognition systems.

The techniques may be implemented in computer hardware or software, or a combination of the two. However, the techniques are not limited to any particular hardware or software configuration; they may find applicability in any computing or processing environment that may be used for improvement of speech recognition. Preferably, the techniques are implemented in computer programs executing on programmable computers that each include a processor, a storage medium readable by the processor (including volatile and non-volatile memory and/or storage elements), at least one input device, and one or more output devices. Program code is applied to data entered using the input device to perform the functions described and to generate output information. The output information is applied to the one or more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages of the invention will become apparent from the following description, including the drawings, and from the claims.

DESCRIPTION OF DRAWINGS

FIG. 1b is a diagram of a category sequence corresponding to the sequence of recognized words shown in FIG. 1a.

DETAILED DESCRIPTION

Figure 1A:
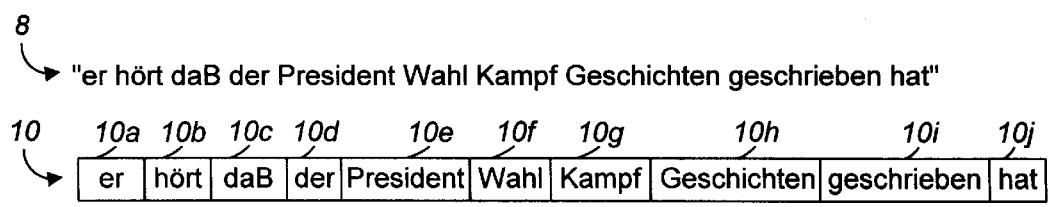
FIG. 1a is a diagram of a sequence of German words spoken by a user and a sequence of corresponding recognized words.
Figure 2:
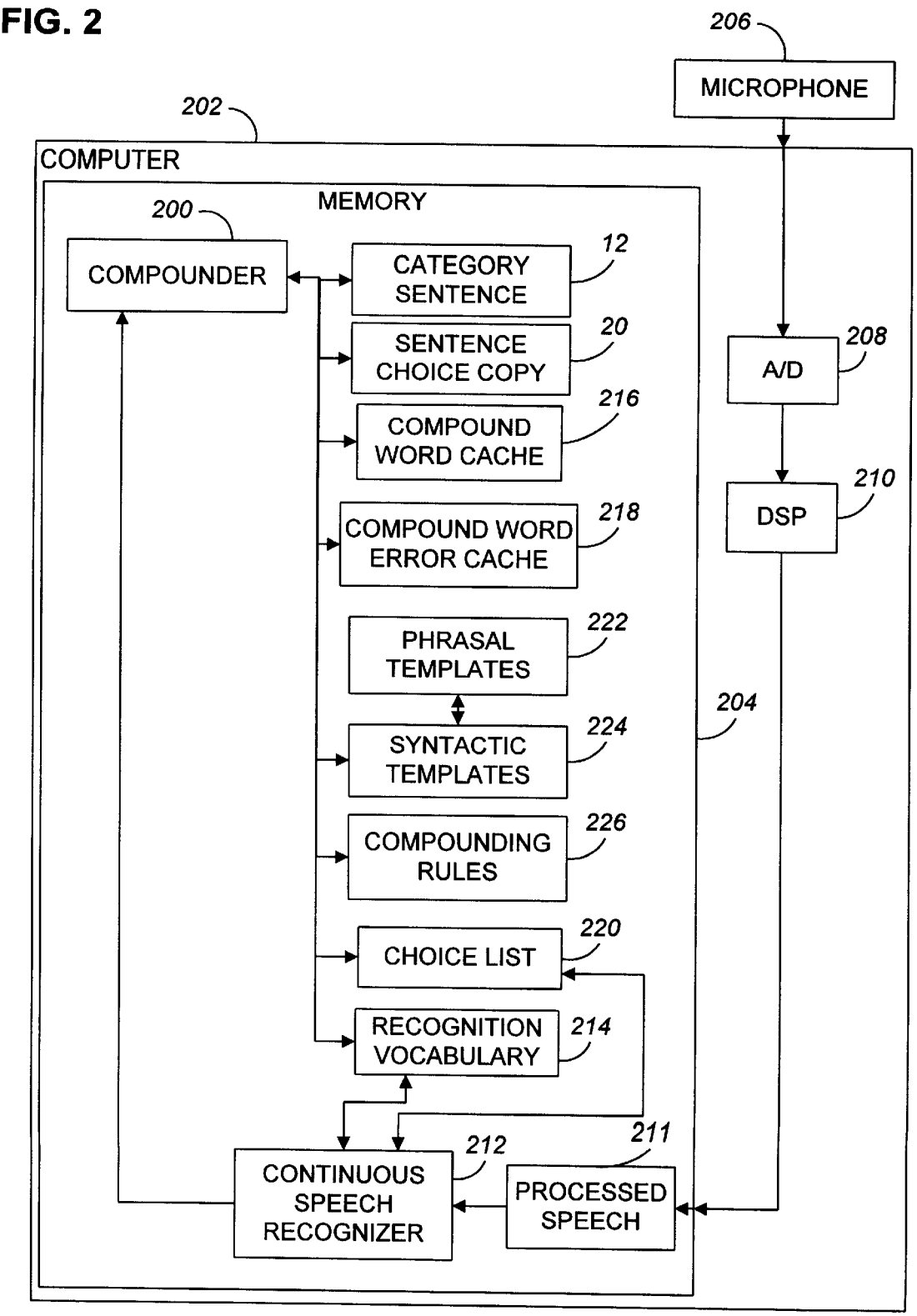
FIG. 2 is a block diagram of a computer.

Referring to FIG. 2, to correctly recognize compound words spoken in German or other languages, a computer 202 includes a compounder process 200 stored in a memory 204. When presented with a sentence choice 10 (FIG. 1a) corresponding to a string of German words 8 spoken by a user, the compounder process 200 identifies the words "Wahl," "Kampf," and "Geschichten" as words to be concatenated into a compound word, and then concatenates them into the compound word "WahlfKampfGeschichten."

Figure 3:
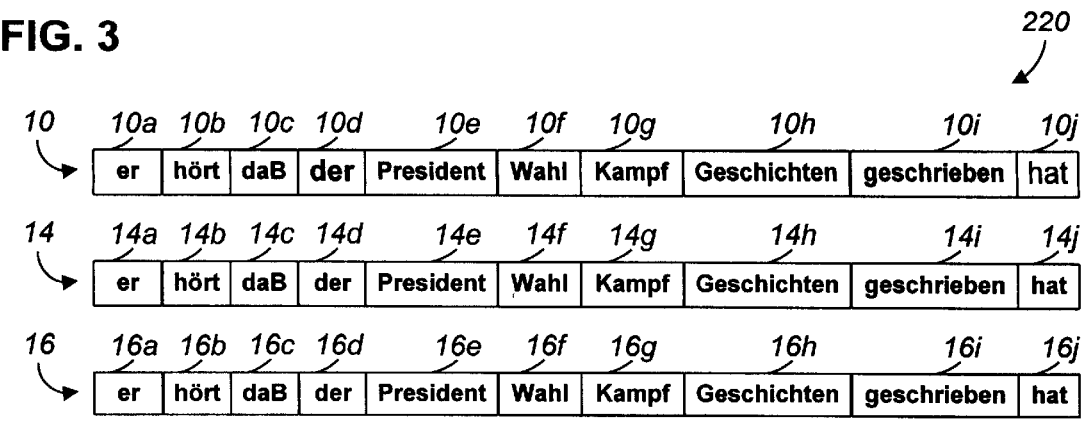
FIG. 3 is a diagram of a choice list of possible sentence choices.

When a user speaks the string of words 8 into a microphone 206, analog signals representing the user's speech are sent to the computer 202, converted from analog into digital form by an analog-to-digital (A/D) converter 208, and processed by a digital signal processor (DSP) 210. The processed speech signals are stored as processed speech 211 in memory 204. A continuous speech recognizer process 212 uses the processed speech 211 to identify the start and end of each spoken sentence, to recognize words in the sentence, and to produce a choice list 220 of possible sentence choices 10, 14, and 16 (FIG. 3). A suitable continuous speech recognizer process is part of NaturallySpeaking™, available from Dragon Systems, Inc. of West Newton, Mass. Each of the sentence choices 10, 14, and 16 represents a possible match for the string of words 8 spoken by the user. The choice list 220 is stored in memory 204 and is ordered such that the most likely correct sentence choice 10, as determined by the recognizer process 212, is at the top of the choice list 220.

Figure 4:
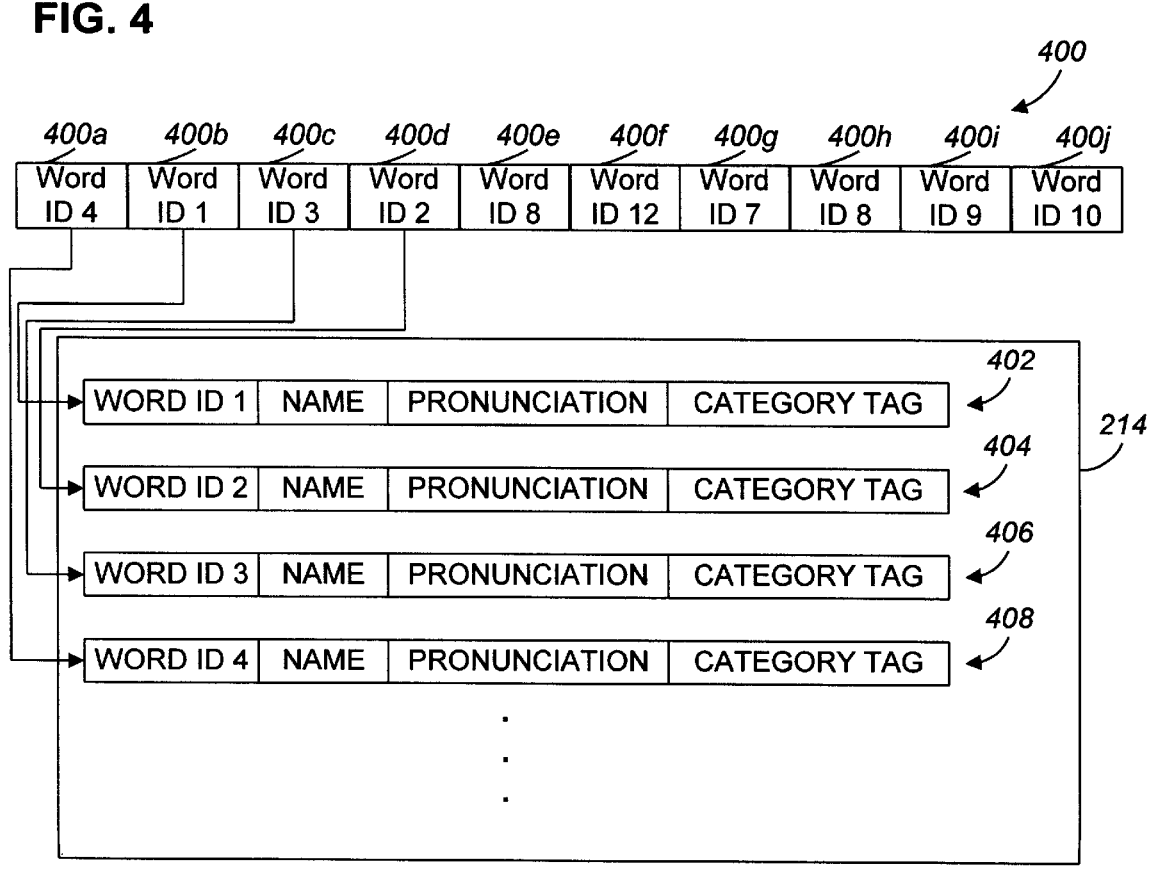
FIG. 4 is a diagram of a sequence of word identifiers and a vocabulary stored in a computer-readable memory.

The sentence choices 10, 14, and 16 are stored in memory 204 as sequences of word identifiers. For example, referring to FIG. 4, sentence choice 10 is represented in memory 204 as a sequence of word identifiers 400 uniquely identifying vocabulary entries in the stored vocabulary 214. For example, the word "er" 10a in sentence choice 10 is represented in memory 204 by a word identifier 400a that matches the "WORD ID" field of a vocabulary entry 408 in the stored vocabulary 214. The "NAME" field in the vocabulary entry 408 is the string "er," the "PRONUNCIATION" field contains a pointer to a speech model of the word "er," and the "CATEGORY TAG" field contains information such as the part of speech of the vocabulary entry 408, e.g., that it is a noun.

Figure 1B:
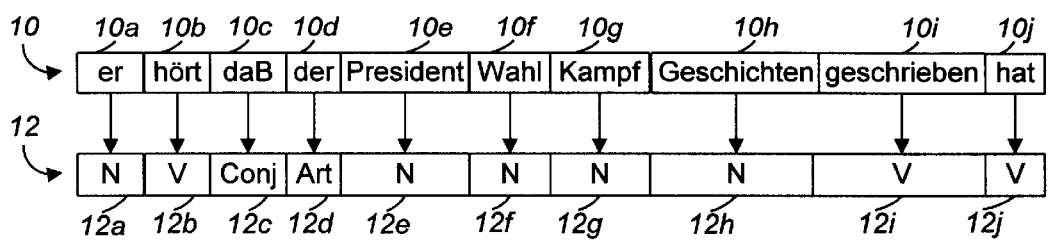
Figure 5:
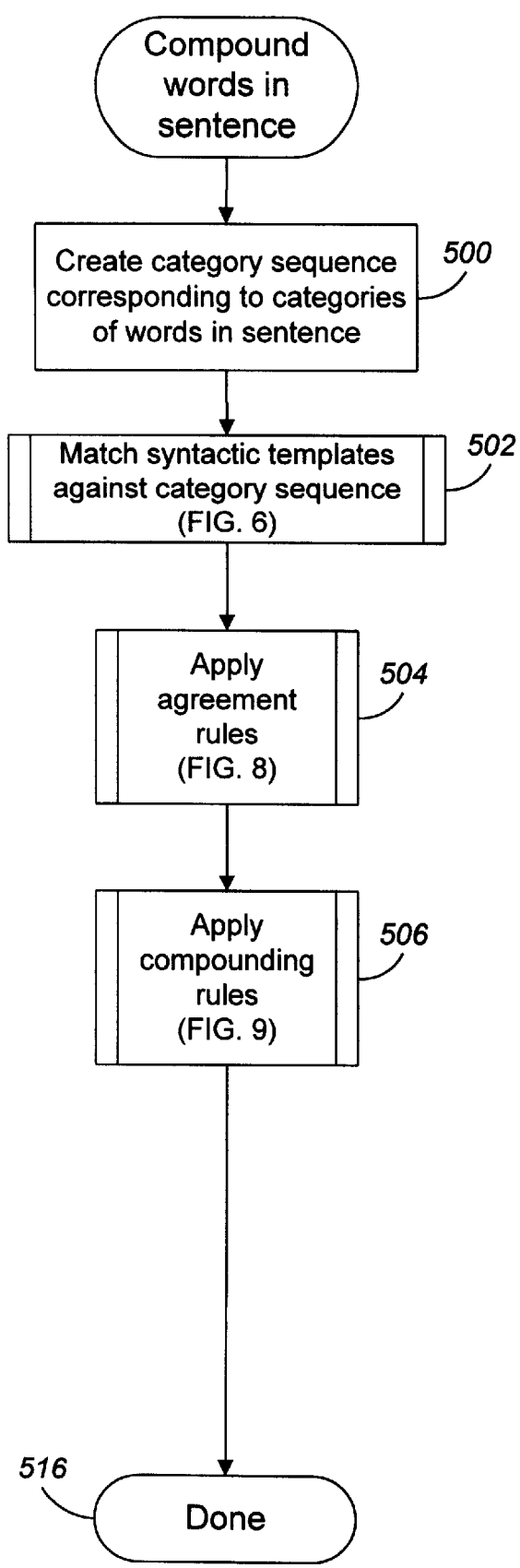
FIG. 5 is a flow chart of a computer-implemented method for concatenating words in a sequence of words into compound words.

Referring to FIG. 5, the compounder process 200 forms compound words from the words 10a–j in the most likely correct sentence choice 10 of the choice list 220 as follows. The compounder process 200 creates a category sequence 12 (FIG. 1b) containing a sequence of categories 12a–j corresponding to the words 10a–j in the most likely correct sentence choice 10 (step 500). For example, category 12e (noun) corresponds to word 10e ("President"). Each of the categories 12a–j is derived from the category tag in the corresponding word's vocabulary entry in the stored vocabulary 214.

The compounder process 200 matches the category sequence 12 against syntactic templates 224 which are also stored in memory 204 (step 502). As described in more detail below with respect to FIG. 6, the syntactic templates 224 are used to identify words within the sentence choice 10 which should not be concatenated with other words to form compound words, by defining sequences of word categories which typically do not result in creation of compound words in German.

Each syntactic template 224 includes a pair of phrasal templates drawn from phrasal templates 222, stored in memory 204. A phrasal template defines a sequence of word categories. Six phrasal templates used by the compounder process 200 are shown in Table 1, below.

TABLE 1

| Phrasal Template Label | Phrase |
| --- | --- |
| PH1 | P GAP N |
| PH2 | N/ |
| PH3 | N V |
| PH4 | N VV |
| PH5 | oos GAP N |
| PH6 | N+ |

Within a phrasal template, "P" represents a preposition, "N" represents a noun, "GAP" represents any string of one or more words that does not include a noun or a personal pronoun, "/" represents a past participle, "V" represents a verb infinitive, "VV" represents an inflected verb, "oos" represents a subordinate conjunctor, and "N+" represents one or more nouns. Phrasal template PH4, for example, represents a phrase consisting of a noun followed by an inflected verb.

The set of syntactic templates 224 used by the compounder 200 is shown in Table 2, below. Syntactic template R1, for example, consists of the phrasal template PH1 followed by the phrasal template PH2. The compounder process 200 uses the syntactic templates 224 shown in Table 2 because, in German, if the categories of a sequence of words match a sequence of categories defined by a syntactic template, then words in the sequence whose categories cross a phrasal template boundary are typically not concatenated to form a compound word.

TABLE 2

| Syntactic Template | Phrasal Templates |
| --- | --- |
| R1 | PH1 PH2 |
| R2 | PH1 PH3 |
| R3 | PH1 PH4 |
| R4 | PH5 PH2 |
| R5 | PH5 PH3 |
| R6 | PH5 PH4 |
| R7 | PH5 PH6 |

Figure 6:
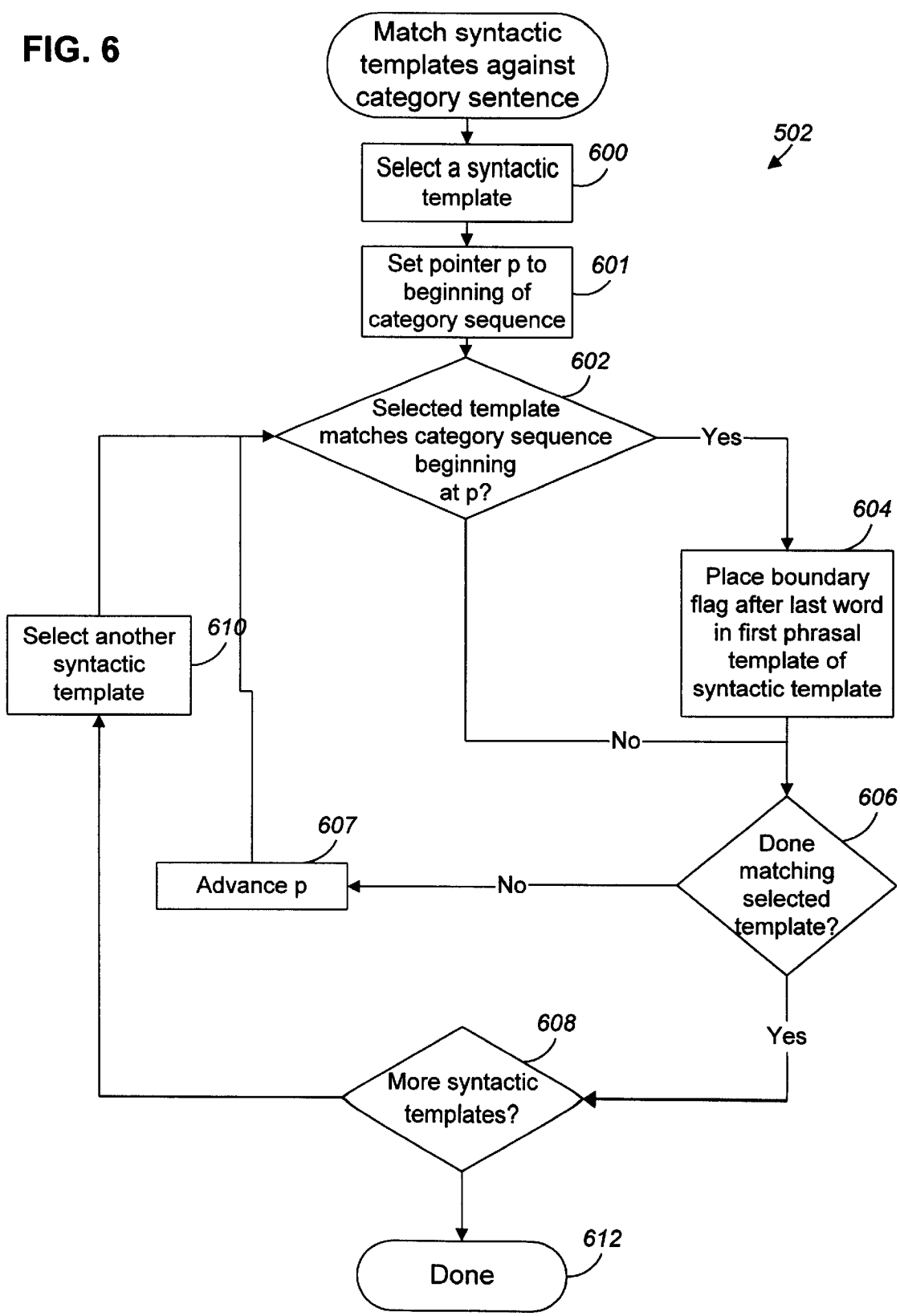
FIG. 6 is a flow chart of a computer-implemented method for matching syntactic templates against a category sequence.
Figure 7A:
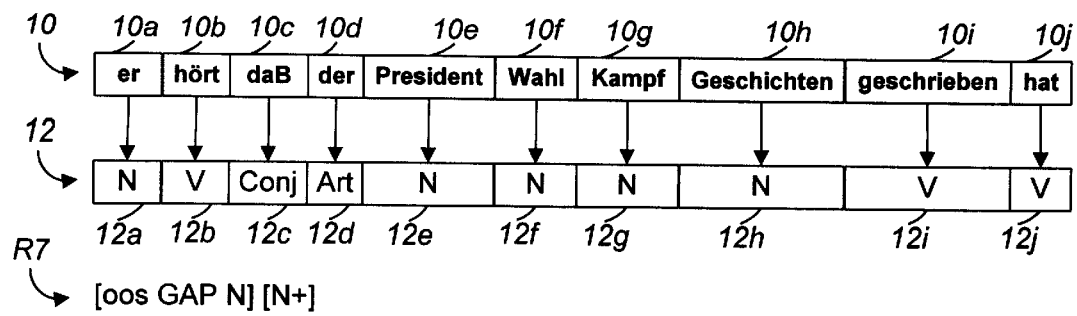
FIG. 7a is a diagram of a sequence of recognized words, a corresponding category sequence, and a syntactic template.

Referring now to FIG. 6, the compounder process 200 matches the syntactic templates 224 against the category sequence 12 as follows. The compounder process 200 selects a syntactic template (step 600), e.g., syntactic template R7 in Table 2. A pointer p is set to point to the beginning of category sequence 12 (step 601). The compounder process 200 compares the selected syntactic template to the category sequence 12 beginning at point p (step 602). For example, the compounder process 200 compares syntactic template R7 (containing the phrasal templates [oos GAP n] and [N+]) to the beginning of category sequence 12. As shown in FIG. 7a, since the first category in the selected syntactic template is a subordinate conjunctor and the first category in category sequence 12 is a noun, the comparison fails.

If the comparison fails (decision step 602), then the compounder process 200 advances the pointer p to the next category in category sequence 12 (step 607) and compares the selected syntactic template against the category sequence 12 beginning at the new point p (step 602).

Figure 7B:
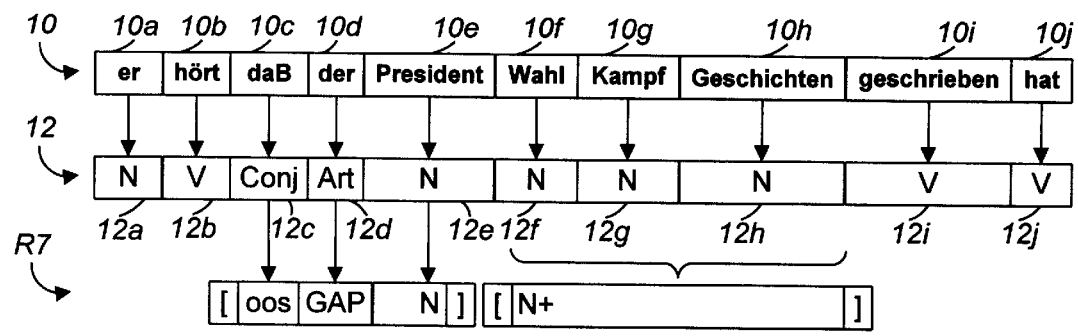
FIG. 7b is a diagram of a sequence of recognized words, a corresponding category sequence, and a syntactic template which matches part of the category sequence.
Figure 7C:
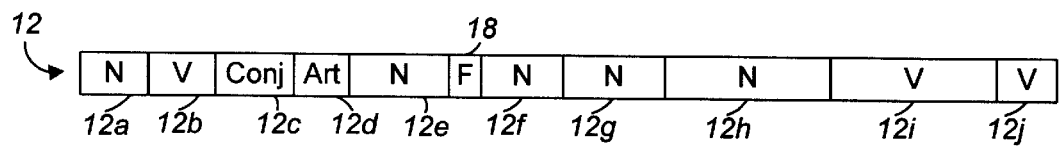
FIG. 7c is a diagram of a category sequence which includes a boundary flag.

If the comparison at step 602 succeeds, then a boundary flag is placed after the category in the category sequence 12 corresponding to the last word in the first phrasal template of the selected syntactic template (step 604). For example, as shown in FIG. 7b, syntactic template R7 matches the categories of the words "daB der President Wahl Kampf Geschichten." As a result, a boundary flag 18 is inserted into category sequence 12 after category 12e (corresponding to "President") and before category 12f (corresponding to "Wahl"), corresponding to the boundary between the two phrasal templates in syntactic template R7. The resulting category sequence 12 is shown in FIG. 7c.

The compounder process 200 continues to match syntactic templates against the category sequence 12 until all syntactic templates have been compared with all subsequences of the category sequence 12.

Referring again to FIG. 5, after matching the syntactic templates against the category sequence 12, the compounder process 200 applies agreement rules to the category sequence 12 (step 504). The agreement rules make use of agreement of case, gender, and number within the sentence choice 10 to further identify which words within the sentence choice 10 should not be concatenated to form compound words.

Figure 8:
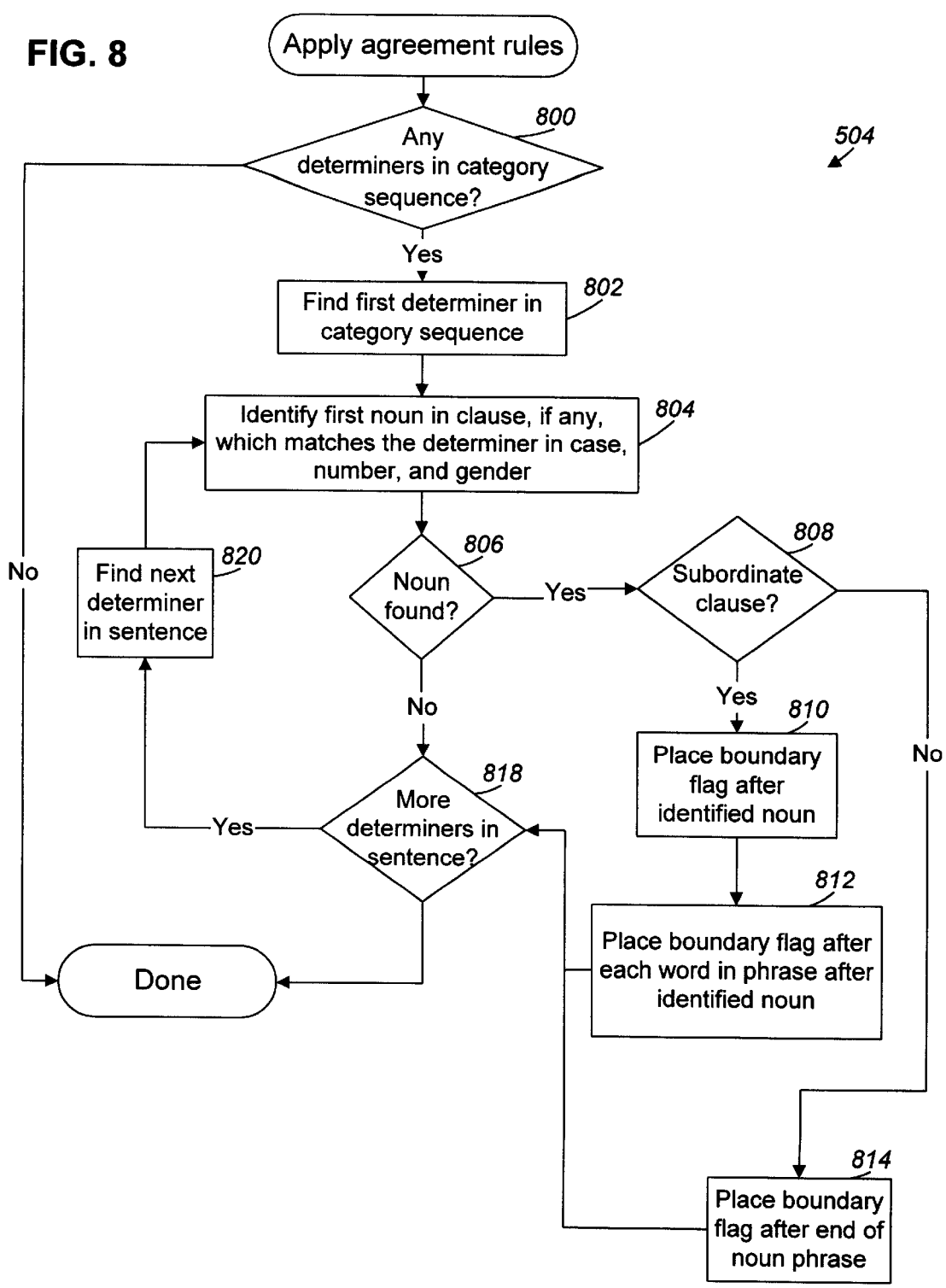
FIG. 8 is a flow chart of a computer-implemented method for applying agreement rules to a category sequence.

A "determiner" is defined as any word that is a definite or indefinite article, a personal pronoun, a demonstrative pronoun, or a possessive pronoun. As shown in FIG. 8, if there are no determiners within the category sequence 12 (decision step 800), then the agreement rules are not applicable. Otherwise, the compounder process 200 identifies the first determiner in the category sequence 12 (step 802) and identifies the first noun, if any, in the clause begun by the determiner in case, number, and gender (step 804). If such a noun is found (decision step 806), then: (1) if the noun is in a subordinate clause (decision step 808), a boundary flag is placed in the category sequence 12 after the noun (step 810) and after each word in the noun phrase following the noun (step 812), (2) if the noun is not in a subordinate clause (decision step 808), then a boundary flag is placed in the category sequence 12 after the end of the noun phrase (step 814). This process is repeated for each determiner in the category sequence 12. Placement of boundary flags guards against overgeneration of compound words. A greater or fewer number of boundary flags may be placed within the category sequence 12 depending on the extent to which generation of compound words is favored.

Referring again to FIG. 5, after the compounder process 200 applies agreement rules to the category sequence 12, the compounder process applies compounding rules to the category sequence to determine which words in the sentence choice 10, if any, should be concatenated into compound words (step 506). A compounding rule defines a category sequence. The compounder process 200 concatenates sequences of words whose categories match a sequence of categories defined by a compounding rule, unless there is a boundary flag within the sequence of words. The compounding rules used by the compounding process 200 are shown in Table 3.

TABLE 3

| Compounding Rule | Category Sequence |
| --- | --- |
| C1 | N N |
| C2 | N_N N |
| C3 | P cdz V |
| C4 | a cdz V |
| C5 | P // |
| C6 | P / |
| C7 | P V |
| C8 | a N |
| C9 | a ag |
| C10 | cff N |
| C11 | cff CTR |
| C12 | cff cff |
| C13 | caf N |
| C14 | cdd N |
| C15 | cai N |
| C16 | cai V |
| C17 | cai / |
| C18 | cai // |
| C19 | cai a |
| C20 | cai ag |
| C21 | V L |
| C22 | E cdz V |
| C23 | E // |
| C24 | E / |
| C25 | E V |
| C26 | ZA ZA |
| C27 | ZA cfr ZA |
| C28 | cgl ag |
| C29 | cgl // |
| C30 | cgl / |

As used in Table 3, N_N represents a "new noun." If the compounder process 200 encounters a capitalized word that is not in the recognition vocabulary 214, the compounder process 200 assumes that the word is a noun and assigns the category N_N to it. As used in Table 3, cdz represents the German preposition "zu," V represents a verb infinitive, a represents a predicative adjective, ag represents a conjugated adjective, cff represents directions (e.g., North and East), CTR represents a country, state, region, or area, caf represents any month of the yar, cai represents a hyphenated noun (e.g., a noun beginning with Euro- or Geo-), L represents a verb infinitive of the German word "lernen" (to learn), E represents the German word "ein," ZA represents a number, cfr represents the German word "und," and cgl represents words that are prepositions and adverbs at the same time. The categories used in Table 3 are derived from a larger set of categories that are assigned to words in the recognition vocabulary 214.

Figure 9:
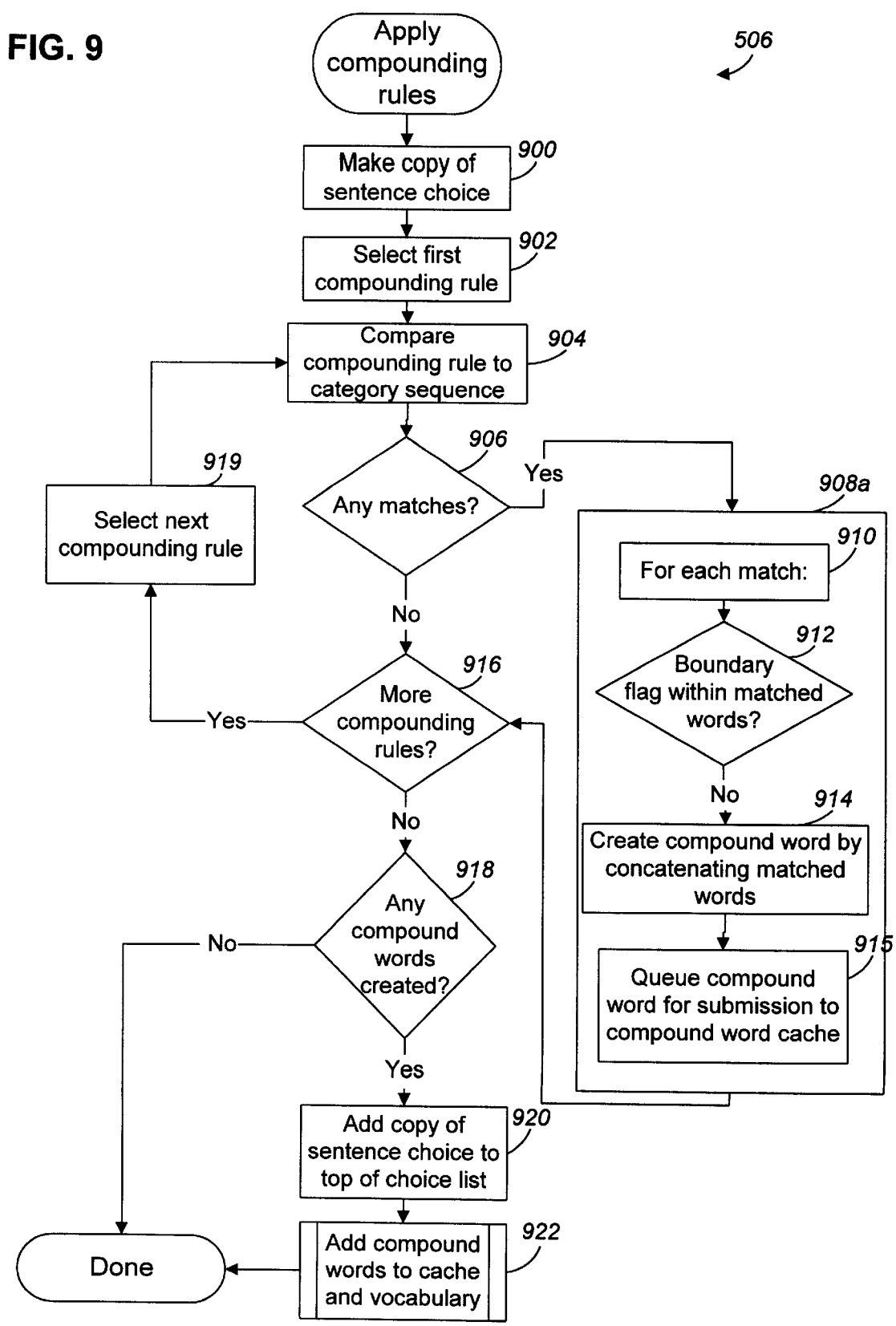
FIG. 9 is a flow chart of a method for concatenating words into compound words.
Figure 10A:
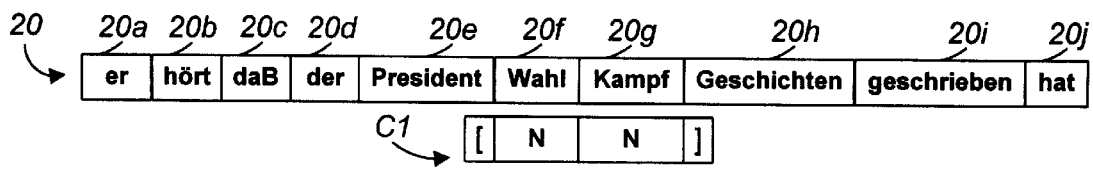
FIGS. 10a–10c are diagrams of a sentence choice in various stages of the compounding process.

Referring to FIG. 9, the compounder process 200 concatenates words in the sentence choice 10 into compound words as follows. The compounder process 200 makes a copy 20 (FIG. 10a) of the sentence choice 10 and stores the copy in memory 204 (step 900). The compounder process selects the first compounding rule (step 902) and compares the sequence of categories defined by the compounding rule to the category sequence 12 associated with the sentence choice 10 (step 904). If the compounding rule matches any subsequence in the category sequence 12 (decision step 906), then a loop 908a is entered in which for each matching subsequence (step 910), the compounder process 200 creates a compound word by concatenating the words in the sentence choice copy 20 corresponding to the subsequence (step 914) if the subsequence does not contain a boundary flag (decision step 912). The resulting compound word is queued for submission to a compound word cache 216 (step 915), described in more detail with respect to FIG. 12, below. The compounder applies the remaining compounding rules to the category sequence 12 (steps 902–919).

Figure 10B:
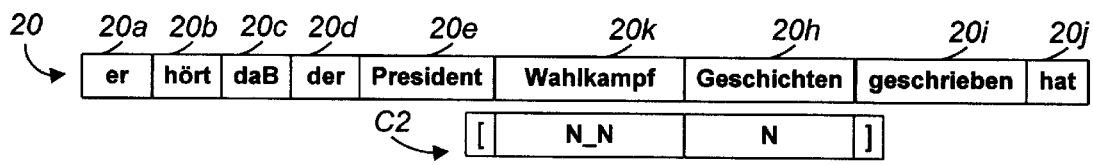
Figure 10C:

For example, compounding rule C1 (N N) matches the words "Wahl" 20f and "Kampf" 20g in sentence choice copy 20, so the words 20f and 20g are compounded, resulting in the sentence choice copy 20 shown in FIG. 10b. Compounding rule C2 (N_N N) matches the compound word "Wahlkampf" 20k and the word "Geschichten" 20h, so the words 20k and 20h are compounded, resulting in the sentence choice copy 20 shown in FIG. 10c.

Figure 11:
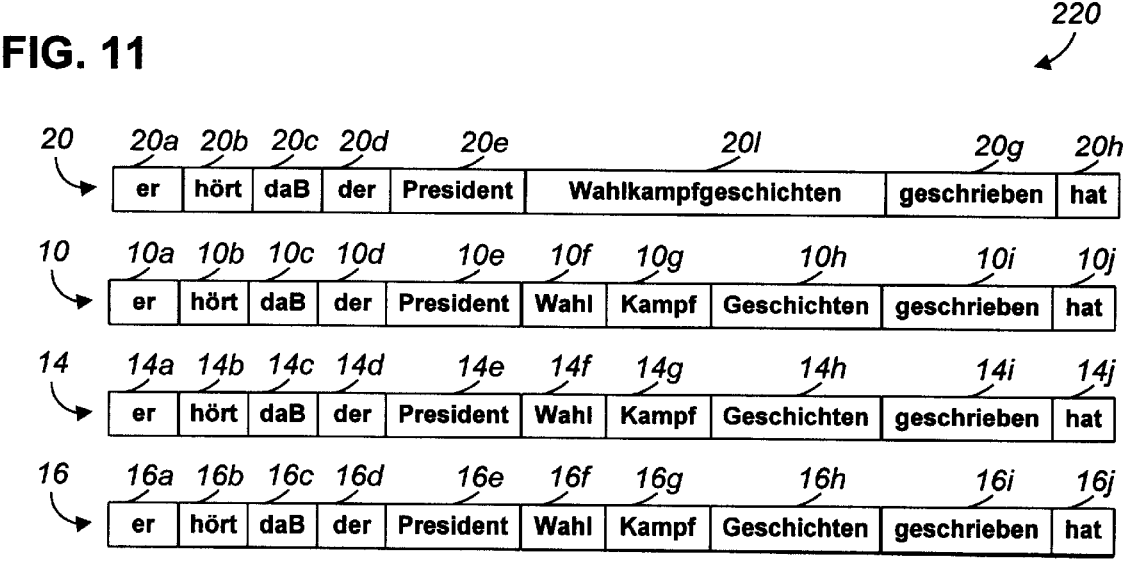
FIG. 11 is a diagram of a choice list with a sentence choice including a compound word.

If no compound words were created during application of the compounding rules (decision step 918), then application of the compounding rules is complete. Otherwise, the sentence choice copy is added to the top of the choice list 220 (step 920). The choice list 220 resulting from application of the compounding rules to the sentence choice 10 is shown in FIG. 11. The compound words are then added to a compound word cache 216 and to the recognition vocabulary 214 (step 922). Adding the compound words to the recognition vocabulary 214 allows the continuous speech recognizer 212 to directly recognize future occurrences of such words without the aid of the compounder process 200.

Figure 12:
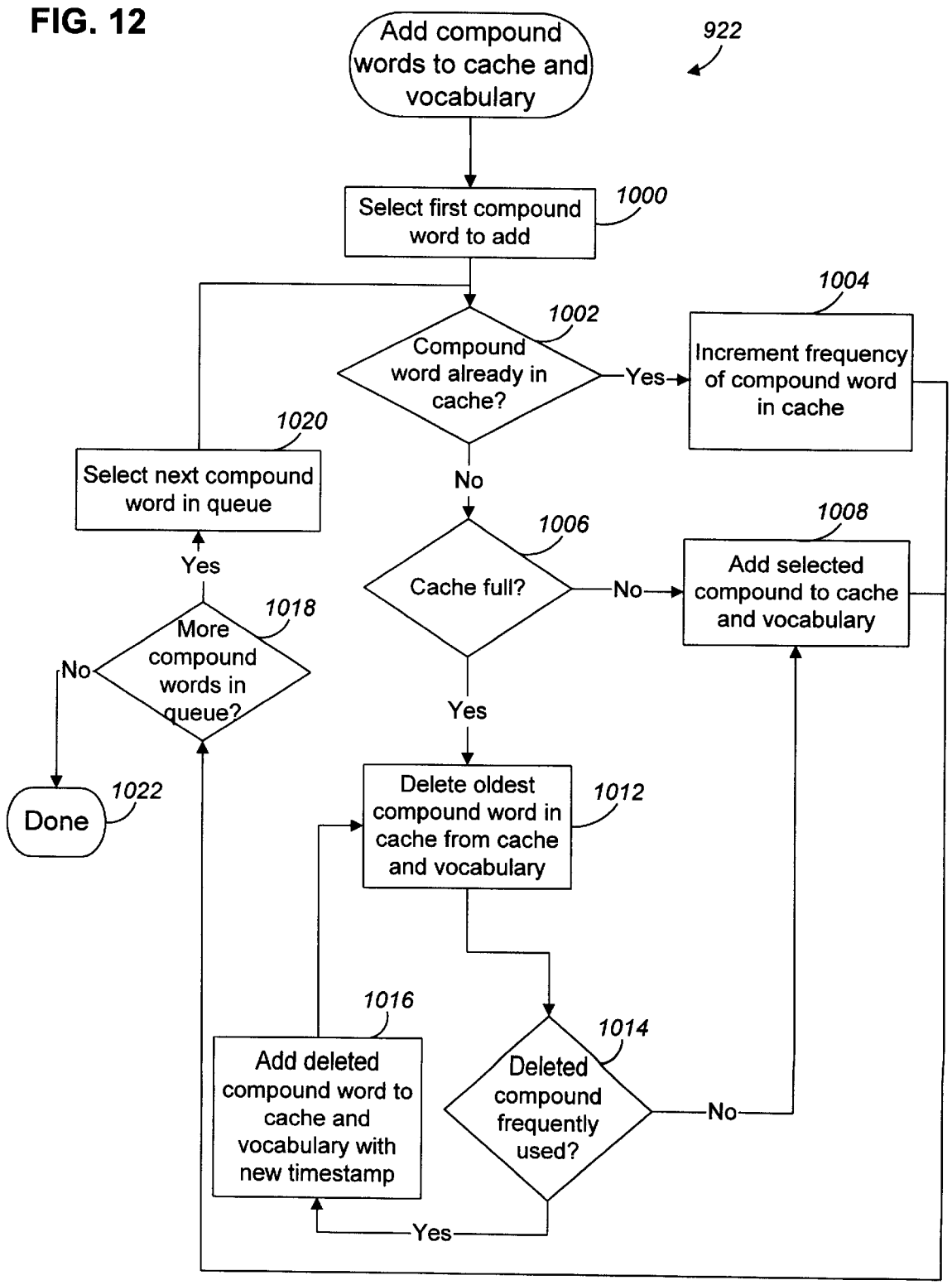
FIG. 12 is a flow chart of a method for adding compound words to a compound word cache and to a vocabulary.

The compound word cache 216 contains compound words which have previously been created by the compounder process 200. Associated with each compound word in the compound word cache 216 is a frequency corresponding to the number of times that the compound word has been recognized. Referring to FIG. 12, compound words that have been queued for submission to the compound word cache 216 are added to the compound word cache 216 and to the recognition vocabulary 214 as follows. The compounder process 200 selects a compound word from the set of compound words (step 1000). If the selected compound word is already in the compound word cache (decision step 1002), then the frequency of the selected compound word is incremented (step 1004).

If the selected compound word is not in the compound word cache (decision step 1002), then the selected compound word is added to the compound word cache 216 (step 1008) if the compound word cache 216 is not full (decision step 1006). If the compound word cache 216 is full (decision step 1006), then the oldest compound word in the compound word cache 216 is deleted from the compound word cache 216 and from the recognition vocabulary 214 (step 1012). If the deleted compound word is frequently used (e.g., if its frequency is greater than a predetermined threshold frequency) (decision step 1014), then the deleted compound word is added to the compound word cache and the recognition vocabulary 214 with a new timestamp corresponding to the current time (step 1016). Steps 1012–1016 are repeated as necessary until the compound word that is deleted is not a frequently used compound word. The selected compound word is added to the compound word cache 216 and to the recognition vocabulary 214 (step 1008).

If there are more compound words in the queue (decision step 1018), then the next compound word is selected from the queue (step 1020), and steps 1002–1016 are repeated. Otherwise, addition of compound words is complete (step 1022).

Figure 13:
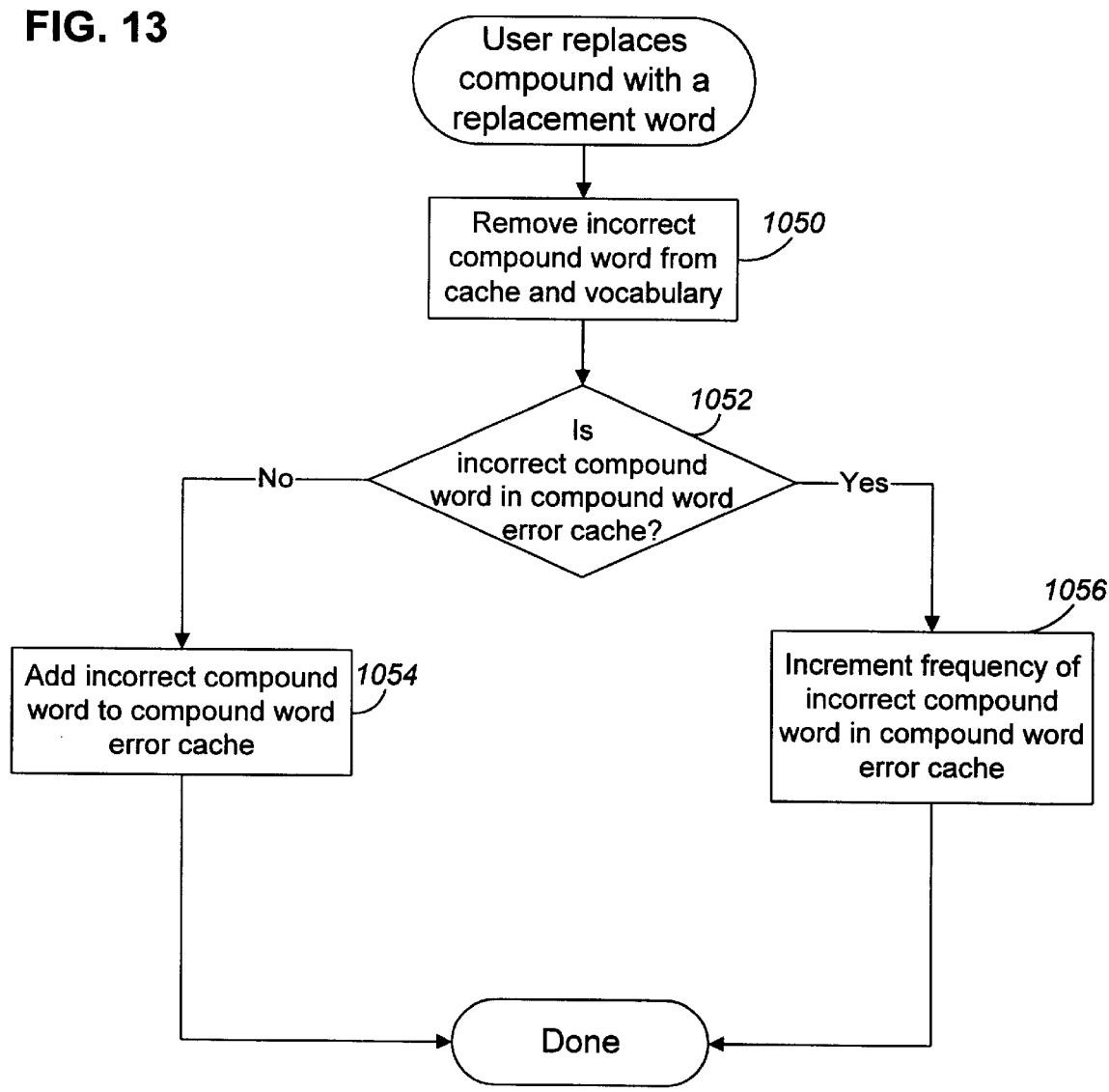
FIG. 13 is a flow chart of a method for correcting an incorrect compound word.

The compounder process 200 may create incorrect compound words. In such cases the user may replace the incorrect compound word with a replacement word. Referring to FIG. 13, when a user replaces an incorrect compound word with a replacement word, the compounder process 200 removes the incorrect compound word from the compound word cache 216 and from the recognition vocabulary 214 (step 1050). Compound words which have been identified by the user as incorrect are stored in a compound word error cache 218. Associated with each compound word in the compound word error cache is a frequency indicating the number of times that the user has identified the compound word as being incorrect. If the incorrect compound word is not in the compound word error cache 218 (decision step 1052), then the incorrect compound word is added to the compound word error cache (step 1054). Otherwise, the frequency of the incorrect compound word in the compound word error cache 218 is incremented (step 1056).

Figure 14:
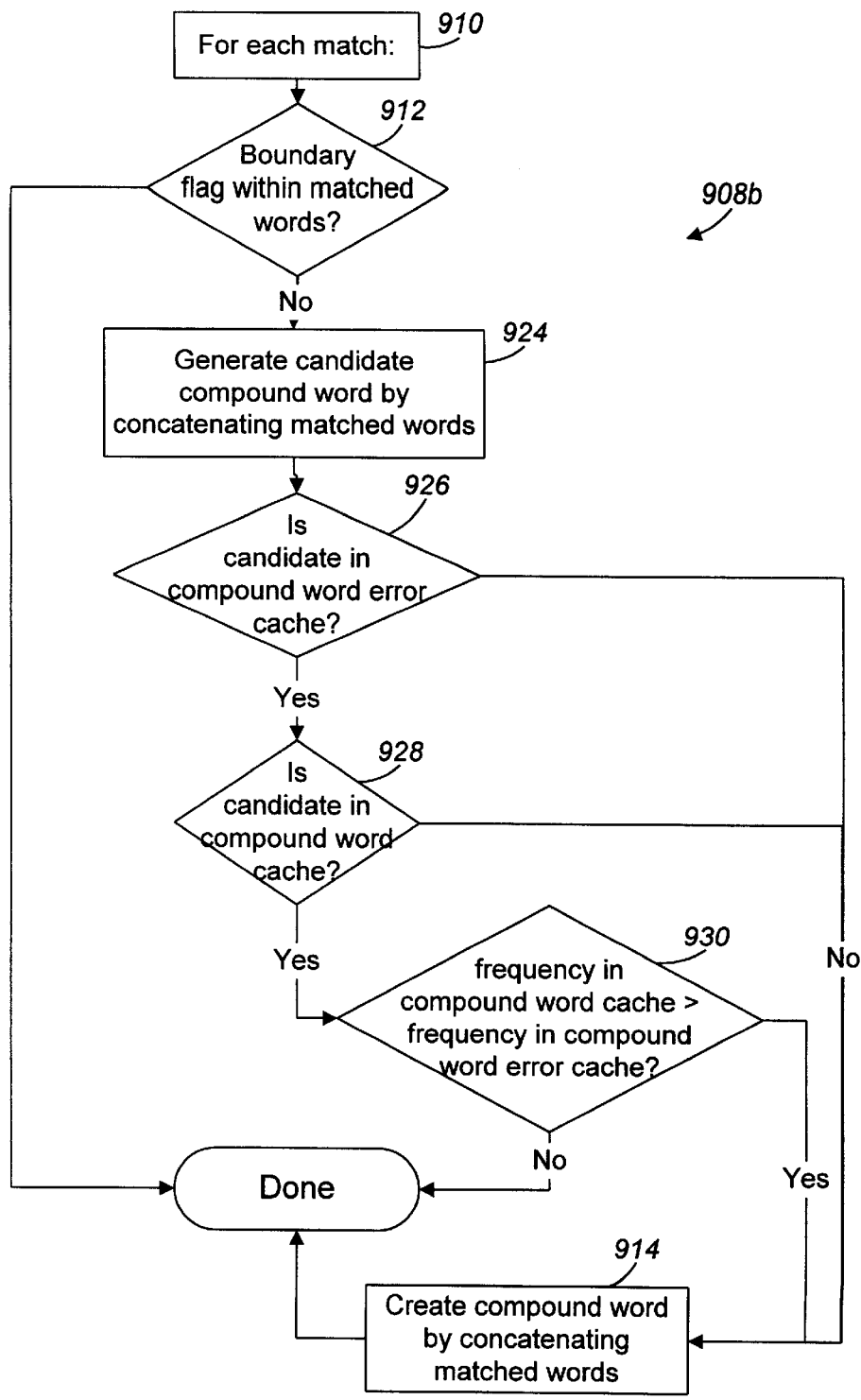
FIG. 14 is a flow chart of a method for improving recognition of compound words.

The compounder process 200 can use the compound word error cache 218 to improve recognition of compound words by not generating compound words that were previously identified as incorrect. For example, referring to FIG. 14, a loop 908b may be used in place of the loop 910a (FIG. 9) during compound word recognition. For each subsequence of words matching a compound rule (step 910), if the subsequence does not contain a boundary flag (decision step 912), a candidate compound word is generated by concatenating the sequence of matching words (step 924). If the candidate compound word is in the compound error cache (decision step (926), and the candidate compound word is not in the compound word cache (decision step 928), then a compound word is created by concatenating the matched words (step 914). If the candidate compound word is in both the compound word error cache (decision step 926) and the compound word cache (decision step 928), then a compound word is created from the matched words (step 914) only if the frequency of the candidate word in the compound word cache is greater than the frequency of the compound word in the compound word error cache (decision step 930).

Although elements of the invention are described in terms of a software implementation, the invention may be implemented in software or hardware or firmware, or a combination of the three. Other embodiments are within the scope of the claims.

What is claimed is:

1. In a system for recognizing the speech in a language, a computer-implemented method for improving recognition of a text string, the text string comprising words associated with parts of speech, the method comprising:
   analyzing the text string with respect to information about expected patterns of the parts of speech in the language, the information comprising:
      rules descriptive of combinations of parts of speech in the language corresponding to compound words in the language; and
      rules descriptive of unpreferred combinations of parts of speech in the language; and
   modifying the text string based on the analysis.

2. The method of claim 1, wherein the combinations comprise sequences.

3. The method of claim 1, wherein the analyzing step comprises:
   comparing the combinations of parts of speech to parts of speech associated with the words in the text string; and
   if at least one of the combinations of parts of speech matches parts of speech associated with the words, indicating that a compound word should be formed from the words associated with the matched parts of speech.

4. The method of claim 3, further comprising:
   analyzing the text string with respect to rules descriptive of unpreferred combinations of parts of speech in the language corresponding to combinations of words which do not typically form compound words in the language; and
   if at least one of the unpreferred combinations of parts of speech matches parts of speech associated with the words, indicating that a compound word should not be formed from the words associated with the matched parts of speech.

5. The method of claim 4, further comprising:
   analyzing the text string with respect to agreement rules descriptive of patterns of agreement of case, number, and gender of words corresponding to combinations of words which do not typically form compound words in the language; and
   if at least one of the agreement rules matches words in the text string, indicating that a compound word should not be formed from the matching words.

6. The method of claim 5, wherein the agreement rules include a rule indicating that if a noun in a subordinate clause matches the case, number, and gender of a preceding determiner, a compound word should not be formed from the noun and subsequent words in the subordinate clause.

7. The method of claim 5, wherein the agreement rules include a rule indicating that if a noun in a non-subordinate clause matches the case, number, and gender of a preceding determiner, a compound word should not be formed from words in the noun phrase containing the noun and words subsequent to the noun phrase.

8. The method of claim 3, wherein the unpreferred combinations of parts of speech correspond to combinations of groups of parts of speech, the groups corresponding to phrases.

9. The method of claim 8, wherein groups comprise pairs.

10. The method of claim 3, further comprising:
    adding the compound word to a compound word cache.

11. The method of claim 10, wherein adding the compound word to the compound word cache comprises increasing a frequency of the compound word in the compound word cache.

12. The method of claim 3, further comprising:
    identifying the compound word as an incorrect compound word; and
    adding the compound word to a compound word error cache.

13. The method of claim 12, wherein adding the compound word to the compound word error cache comprises increasing a frequency of the compound word in the compound word error cache.

14. The method of claim 3, further comprising:
    if the compound word has been identified as an incorrect compound word, indicating that the compound word should not be formed from the words associated with the matched parts of speech.

15. The method of claim 14, wherein the compound word has been identified as an incorrect compound word in response to action of a user by adding the compound word to a compound word error cache.

16. The method of claim 3, further comprising:
    indicating that the compound word should not be formed from the words associated with the matched parts of speech if the compound word has been identified as an incorrect compound word more frequently than the compound word has not been identified to be an incorrect compound word.

17. The method of claim 1, wherein modifying the text string comprises forming a compound word from words in the text string.

18. The method of claim 17, further comprising adding the compound word to a vocabulary.

19. The method of claim 17, wherein modifying the text string comprises replacing words in the text string with the compound word.

20. The method of claim 19, further comprising:
   adding the modified text string to a list of candidate text strings.

21. The method of claim 17, further comprising:
   adding the compound word to a compound word cache.

22. The method of claim 21, wherein adding the compound word comprises increasing the frequency count of the compound word in the compound word cache.

23. The method of claim 17, further comprising:
   adding the compound word to a vocabulary.

24. The method of claim 1, wherein the language comprises German.

* * * * *